(12) United States Patent
Mateer et al.

(10) Patent No.: US 9,609,136 B1
(45) Date of Patent: Mar. 28, 2017

(54) CALL STEERING IN A CALL CENTER SYSTEM

(75) Inventors: Michael T Mateer, Omaha, NE (US); Bruce Pollock, Omaha, NE (US)

(73) Assignee: WEST CORPORATION, Omaha, NE (US)

( * ) Notice: Subject to any disclaimer, the term of this patent is extended or adjusted under 35 U.S.C. 154(b) by 851 days.

(21) Appl. No.: 12/710,828

(22) Filed: Feb. 23, 2010

(51) Int. Cl.
| H04M 3/00 | (2006.01) |
| H04M 5/00 | (2006.01) |
| H04M 3/523 | (2006.01) |
| H04M 3/50 | (2006.01) |

(52) U.S. Cl.
CPC ........... H04M 3/5237 (2013.01); H04M 3/50 (2013.01)

(58) Field of Classification Search
CPC .. H04M 3/5237; H04M 3/493; H04M 3/5166; H04M 3/523; H04M 3/42; H04M 7/1245; H04L 12/6418; H04L 12/66; H04L 65/1083; H04L 65/4007
USPC ....... 370/352-356, 401; 379/265.01-265.02, 379/265.07, 88.03-88.04, 93.09, 379/265.01-266.1, 365.01-265.11, 379/266.01-266.02
See application file for complete search history.

(56) References Cited

U.S. PATENT DOCUMENTS

| 5,828,729 | A * | 10/1998 | Clermont ............. H04Q 3/0025 370/230 |
| 6,553,113 | B1 * | 4/2003 | Dhir et al. ............... 379/265.02 |
| 6,697,858 | B1 * | 2/2004 | Ezerzer ............... H04L 41/0893 370/231 |
| 6,744,878 | B1 * | 6/2004 | Komissarchik et al. 379/265.03 |
| 7,149,303 | B1 * | 12/2006 | Laurinavichus ......... 379/265.01 |
| 8,229,090 | B2 * | 7/2012 | Poi et al. ................... 379/88.18 |
| 8,532,088 | B1 * | 9/2013 | Croak et al. ................. 370/352 |
| 8,971,216 | B2 * | 3/2015 | Beck ................... G06F 17/2765 370/260 |
| 2001/0024497 | A1 * | 9/2001 | Campbell et al. ....... 379/265.09 |
| 2002/0032809 | A1 * | 3/2002 | Bateman et al. ................. 710/5 |
| 2003/0007628 | A1 * | 1/2003 | Vortman ............. H04M 3/5237 379/266.07 |
| 2004/0028213 | A1 * | 2/2004 | Goss ........................ 379/265.09 |
| 2004/0141508 | A1 * | 7/2004 | Schoeneberger et al. .... 370/401 |
| 2004/0174979 | A1 * | 9/2004 | Hutton ................ H04M 3/5166 379/265.02 |
| 2005/0047579 | A1 * | 3/2005 | Salame ............ H04L 29/06027 379/265.09 |

(Continued)

*Primary Examiner* — Wutchung Chu
(74) *Attorney, Agent, or Firm* — Raffi Gostanian

(57) ABSTRACT

A system, method, and computer readable medium for processing call in a call center platform are provided. A call center platform provides for customized delivery of calls to contact centers. The call center platform provides the ability to transfer calls in a manner that reduces carrier connection costs and intra-state costs. The call center platform provides alternative connectivity mechanisms, such as packet-switched, circuit-switched, and multiprotocol label switching connectivity, for a call center enterprise customer. An interactive call center service provider front end includes a media gateway adapted to receive circuit-switched and packet-switched customer calls and a self service platform. Customer calls may be directly connected with the call center front end and contact center via circuit switched connections, via VoIP connections, and may be connected utilizing intelligent call routing and central queue point mechanisms.

20 Claims, 7 Drawing Sheets

(56) References Cited

U.S. PATENT DOCUMENTS

| | | | |
|---|---|---|---|
| 2005/0047584 A1* | 3/2005 | Franklin et al. | 379/265.13 |
| 2005/0148338 A1* | 7/2005 | Baumeister | H04M 3/4931 |
| | | | 455/455 |
| 2005/0195964 A1* | 9/2005 | Hahn | H04L 43/0817 |
| | | | 379/265.02 |
| 2005/0220290 A1* | 10/2005 | Ambrose et al. | 379/266.07 |
| 2006/0062376 A1* | 3/2006 | Pickford | 379/265.12 |
| 2006/0083225 A1* | 4/2006 | Tran | 370/356 |
| 2006/0109837 A1* | 5/2006 | Saha | H04L 29/06027 |
| | | | 370/352 |
| 2006/0153356 A1* | 7/2006 | Sisselman | H04M 3/5233 |
| | | | 379/265.12 |
| 2006/0159027 A1* | 7/2006 | Owens | 370/252 |
| 2006/0221941 A1* | 10/2006 | Kishinsky et al. | 370/352 |
| 2006/0239440 A1* | 10/2006 | Shaffer et al. | 379/265.02 |
| 2006/0256956 A1* | 11/2006 | Lee et al. | 379/266.01 |
| 2007/0003024 A1* | 1/2007 | Olivier et al. | 379/45 |
| 2007/0036331 A1* | 2/2007 | Fitzgerald | 379/265.02 |
| 2007/0064886 A1* | 3/2007 | Chiu et al. | 379/88.17 |
| 2007/0064912 A1* | 3/2007 | Kagan et al. | 379/265.1 |
| 2007/0070980 A1* | 3/2007 | Phelps et al. | 370/352 |
| 2007/0160188 A1* | 7/2007 | Sharpe | H04M 3/5125 |
| | | | 379/265.01 |
| 2007/0201077 A1* | 8/2007 | Morales et al. | 358/1.15 |
| 2008/0089499 A1* | 4/2008 | Hahn | H04M 15/00 |
| | | | 379/114.2 |
| 2008/0095355 A1* | 4/2008 | Mahalaha et al. | 379/265.09 |
| 2008/0240407 A1* | 10/2008 | Srinivasa-Murthy et al. | 379/265.11 |
| 2009/0154678 A1* | 6/2009 | Kewin et al. | 379/201.01 |
| 2009/0238359 A1* | 9/2009 | Ely et al. | 379/265.02 |
| 2009/0318111 A1* | 12/2009 | Desai et al. | 455/406 |
| 2010/0158234 A1* | 6/2010 | Vasquez et al. | 379/212.01 |
| 2010/0296646 A1* | 11/2010 | Hemm et al. | 379/265.02 |
| 2011/0096673 A1* | 4/2011 | Stevenson | H04M 3/50 |
| | | | 370/252 |

* cited by examiner

CALL STEERING IN A CALL CENTER SYSTEM

FIELD OF THE INVENTION

The present invention is generally related to call center technologies and, more particularly, to mechanisms for providing call steering in a system featuring an interactive call center.

BACKGROUND OF THE INVENTION

Telephone call processing and switching systems of many types are known in the art. Such systems are used in telemarketing operations, telephone-based information systems, financial and insurance service operations, and public service centers, to name but a few examples. Automated or semi-automated call centers are examples of such systems, including functional features such as automatic call distributors (ACD), interactive voice response (IVR), also referred to as a voice response unit (VRU), coordinated voice and data delivery, and outdial applications.

For example, telemarketing is a well-known form of remote commerce, that is commerce wherein the person making the sale or taking the sales data is not in the actual physical presence of the potential purchaser or customer. In general operation, a customer may call a toll-free telephone number, such as an 800 number. The number dialed is determined by the carrier as being associated with the telemarketer, and the call is delivered to the telemarketer's call center. A typical call center will have a front end with one or more VRU units, call switching equipment, an ACD, and several work stations having a telephone and computer terminal at which a live operator processes the call. The dialed number, typically taken automatically from the carrier through use of the dialed number identification service (DNIS), is utilized to effect a database access resulting in a "screen pop" of a script on the operator's computer terminal utilizing a computer telephone integration (CTI) network. In this way, when a prospective purchaser calls a given telephone number, a telemarketing operator may immediately respond with a script keyed to the goods or services offered. The response may be at various levels of specificity, ranging from a proffer of a single product, e.g., a particular audio recording, or may be for various categories of goods or services, e.g., where the dialed number is responded to on behalf of an entire supplier. Alternatively, the call center may utilize an outdial application that dials phone numbers of customers in an automated fashion, and connects the dialed customer with an agent. To this end, the outdial application may interface with a database of telephone numbers from which phone numbers to be dialed are retrieved.

Contemporary call platforms have limited ability for customizing the delivery of a call to, for example, a particular agent contact center. Moreover, call center platforms provide little, if any, ability to transfer calls in a manner that reduces carrier connection costs or intra-state costs. Still further, conventional call center technologies do not provide alternative connectivity mechanisms, e.g., packet-switched, circuit-switched, and multiprotocol label switching connectivity, for a call center enterprise customer.

Therefore, what is needed is a mechanism that overcomes the described problems and limitations.

SUMMARY OF THE INVENTION

The present invention provides a system, method, and computer readable medium for customizing the delivery of calls to contact centers. A call center platform provides the ability to transfer calls in a manner that reduces carrier connection costs and intra-state costs. The call center platform provides alternative connectivity mechanisms, e.g., packet-switched, circuit-switched, and multiprotocol label switching connectivity, for a call center enterprise customer. An interactive call center service provider front end includes a media gateway adapted to receive circuit-switched and packet-switched customer calls and a self service platform. Customer calls may be directly connected with the call center front end and contact center via circuit switched connections, via VoIP connections, and may be connected utilizing intelligent call routing and central queue point mechanisms.

In one embodiment of the disclosure, a method for processing calls in a call center system is provided. The method includes receiving a call from a customer at an interactive call center front end, wherein the interactive call center front end is adapted to receive circuit-switched and packet-switched calls, conveying the call to a self service platform for processing of the call, receiving a directive from the customer to connect the call with an agent, determining a contact center of a plurality of contact centers to route the call, and routing the call to an automatic call distributor of the contact center.

In another embodiment of the disclosure, a computer-readable medium having computer-executable instructions for execution by a processing system, the computer-executable instructions for processing calls in a call center system is provided. The computer-readable medium comprises instructions for receiving a call from a customer at an interactive call center front end, wherein the interactive call center front end is adapted to receive circuit-switched and packet-switched calls, conveying the call to a self service platform for processing of the call, receiving, by a voice response unit, a directive from the customer to connect the call with an agent, directing, by the voice response unit, the self service platform to terminate processing of the call by the voice response unit and return processing to the self service platform, determining a contact center of a plurality of contact centers to route the call, and routing the call to an automatic call distributor of the contact center.

In a further embodiment of the disclosure, a system for processing calls in a call center is provided. The system comprises an interactive call center front end that includes a media gateway adapted to interface with a circuit-switched network and a packet-switched network, a self service platform, a voice response unit, and an intelligent call routing server. The system further comprises a plurality of contact centers communicatively coupled with the call center front end, wherein the intelligent call routing server is communicatively coupled with at least one of the contact centers. The front end receives a call from a customer, conveys the call to the self service platform for processing, wherein the self service platform invokes an application for processing the call based at least in part on dialed number identification service data associated with the call. The call is conveyed to the voice response unit for processing until the voice response unit receives a directive from the customer to connect the call with an agent, wherein the voice response unit directs the self service platform to terminate processing of the call by the voice response unit and return processing to the self service platform. The intelligent call routing server determines a contact center of the plurality of contact centers to route the call. The call is then routed to an automatic call distributor of the contact center.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1A:
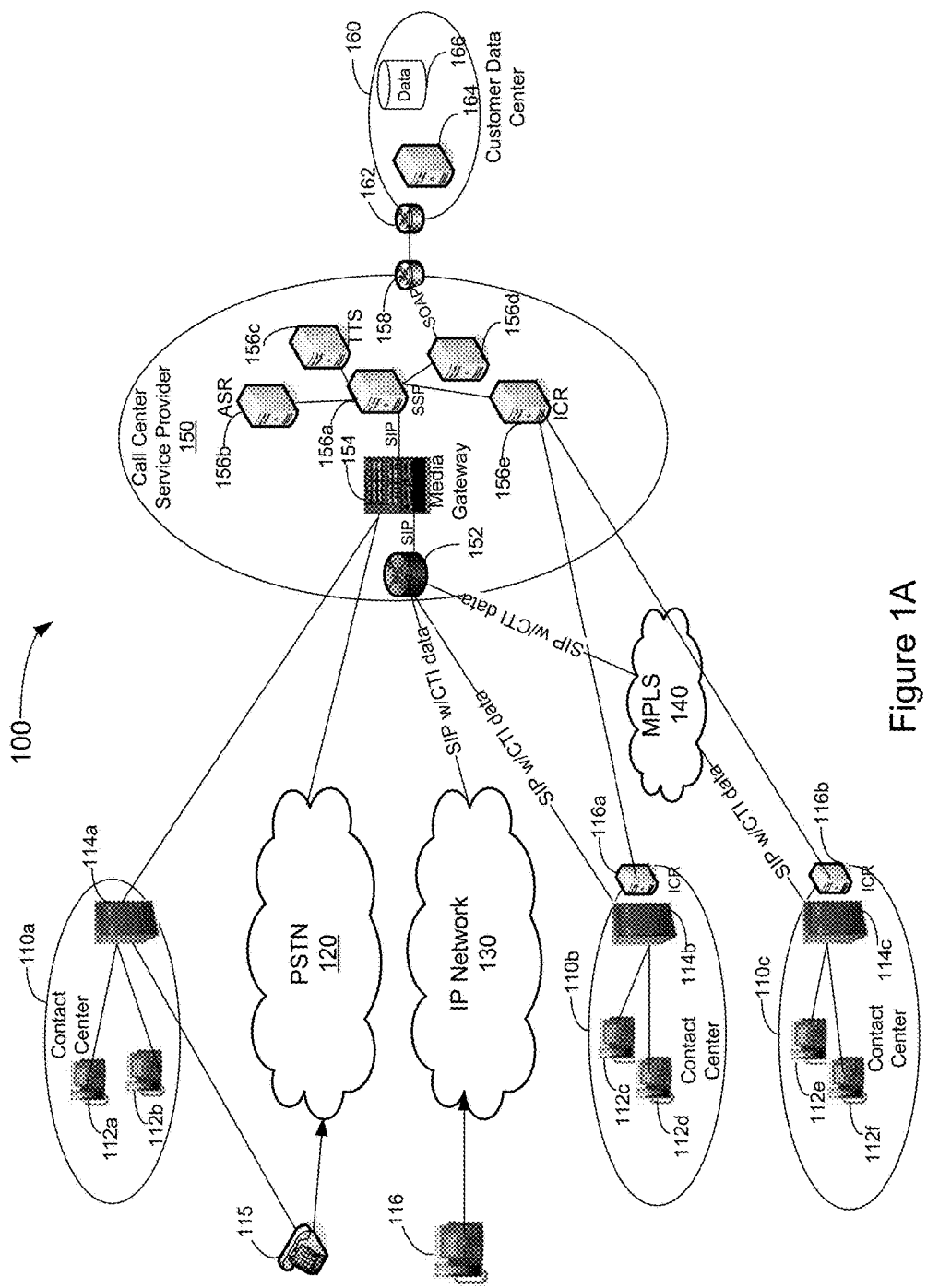
FIG. 1A depicts a diagrammatic representation of a system that includes a call center platform implemented in accordance with an embodiment of the invention.

Now referring to FIG. 1A, a system 100 that includes a call center platform implemented in accordance with an embodiment of the invention is depicted. In the depicted system configuration, various contact centers 110a-110c may be communicatively coupled with an interactive call center service provider front end 150. Contact centers may be operated by a merchant or service retailer, or may be operated by a third part on behalf of a merchant. Front end 150 may include a media gateway 154 that may terminate customer call legs with an agent station. In a preferred embodiment, media gateway 154 comprises a circuit-switched and packet-switched media gateway adapted to interface with both a circuit switched network, e.g., the public switched telephone network (PSTN) 120 and a packet network, such as an Internet Protocol (IP) network 130. Circuit-switched calls may be terminated at media gateway 154 via voice trunks, and packet-switched calls may be connected with media gateway via a router 152. Accordingly, system 100 can accommodate customers using a circuit-switched telephone device 115 and customers using a packet-switched telephone device 116.

Front end 150 may include a self service platform (SSP) 156a that is interconnected with media gateway 154. SSP platform 156a may be communicatively coupled with a variety of servers or functions, including an automatic speech recognition (ASR) server 156b, a text-to-speech (TTS) server 156c, host interface server 156d, and an intelligent call routing server (ICR) 156e. ICR server 156e preferably provides computer telephony integration (CTI) and facilitates centralized queue functionality. Host interface server 156d may be coupled with a customer data center 160, e.g., via routers 158 and 162. Customer data center 160 may include a web services server 164, database services 166, and the like.

Session initiation protocol (SIP) signaling and computer telephony integration (CTI) information may be exchanged between a packet telephony device placing or receiving a call to or from front end 150, and media gateway 154 may utilize SIP and CTI data for creating, modifying, and terminating sessions with a customer and an agent. CTI information obtained by media gateway 154 may include, for example, the caller's number, the number dialed, agent screen population, automated and computer controlled dialing, coordinated phone and data transfers, and the like. SIP information may be conveyed from media gateway 154 to self service platform 156a to facilitate processing of a call. Information conveyed to customer data center 160 from host interface server 156d may be carried over, for example, SOAP as a transport layer.

Each of contact centers 110a-110c includes a respective private branch exchange (PBX) 114a-114c that may connect calls with respective agent stations 112a-112f. In the illustrative example, PBX 114a comprises a circuit switched PBX and may be coupled with media gateway 154 via voice trunks. PBXs 114b and 114c may be implemented as IP PBXs and may be coupled with media gateway 154 over a packet network, e.g., via router 152. In the present example, communications may be made between PBX 114c and media gateway 154 via multiprotocol label switching (MPLS) 140. SIP signaling and CTI information may be communicated between each of packet PBXs 114b-114c and media gateway 154. Additionally, contact centers 114b and 114c may include ICR servers 116a-116b communicatively coupled with ICR server 156e deployed in front end 150.

ASR 156b is adapted to respond to caller or called party entered touch-tone digits and/or to the voice input relayed thereto by media gateway 154. ASR 156b may play digitally recorded speech that provides menu selections to the caller or called party. The customer may then enter the touch-tone digits that correspond to the desired menu selection or provide a voice response. The customer entered digits or voice commands can invoke options as varied as looking up account balances, moving the call within or to another system component, obtaining preliminary information from a caller, or playing a pre-recorded announcement for the caller. ASR 156b may obtain preliminary call information, such as the caller's identity, customer information, preliminary transaction data, or the like.

ICR 156e may feature automatic call distributor functionality. To this end, ICR 156e may include an application that distributes calls to a specific group of terminals that agents use or to a specific terminal of an agent. ICR 156e provides call routing based upon, for example, the availability of operators located at the remote sites, or contact centers, or other call-routing decision criteria.

Figure 1B:
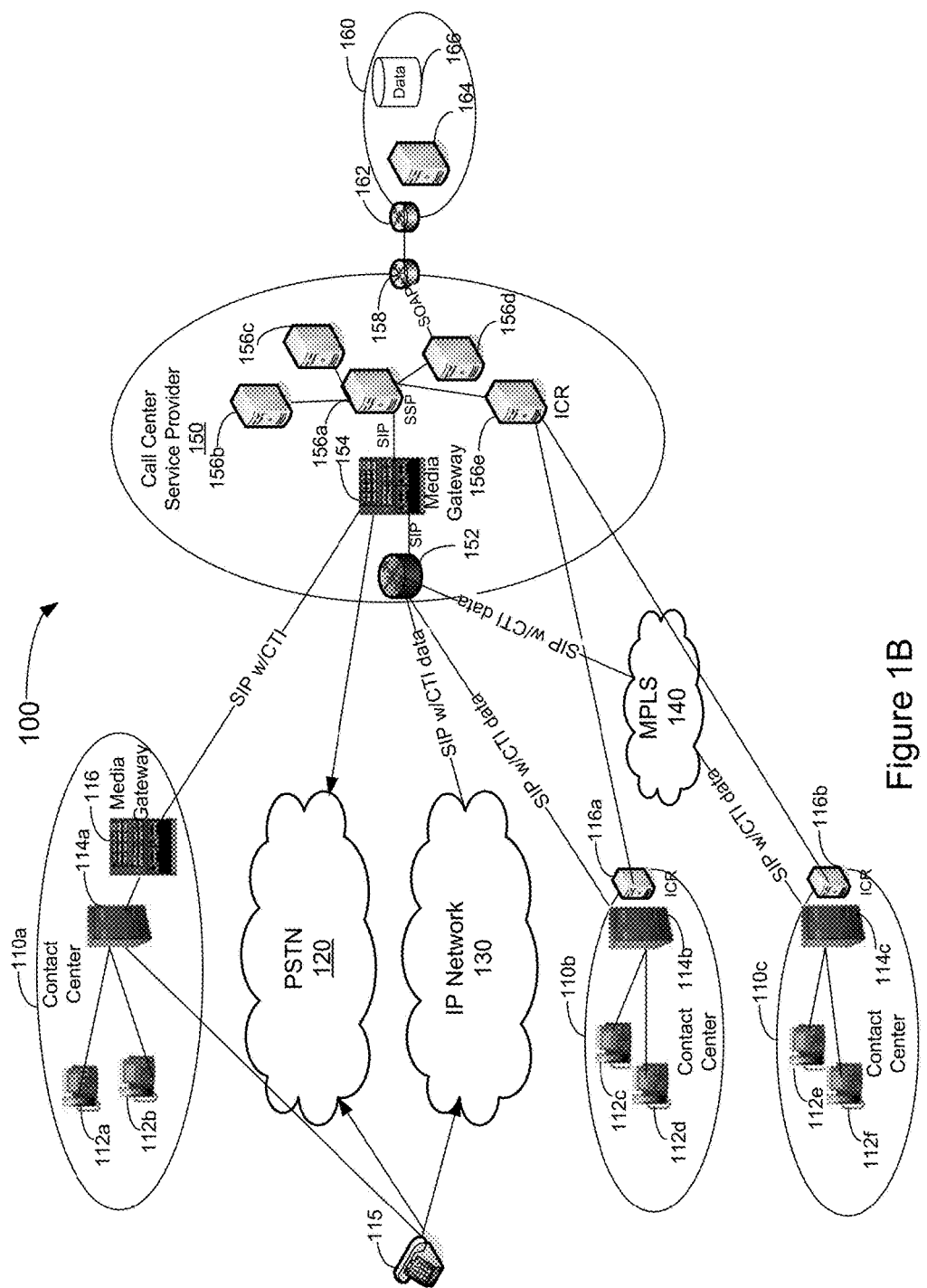
FIG. 1B depicts a diagrammatic representation of a system that includes a call center platform including a media gateway deployed at a customer contact center in accordance with an embodiment of the invention.

In accordance with an embodiment, system functionality may be extended by deploying a media gateway 116 at a customer contact center 110a as depicted in FIG. 1B.

In accordance with embodiments, front end 150 supports class 4 switching and provides direct connection to contact center automatic call distributors. Thus, call center service provider 150 effectively acts as the carrier for merchants or other enterprise clients of the call center service provider.

Figure 2:
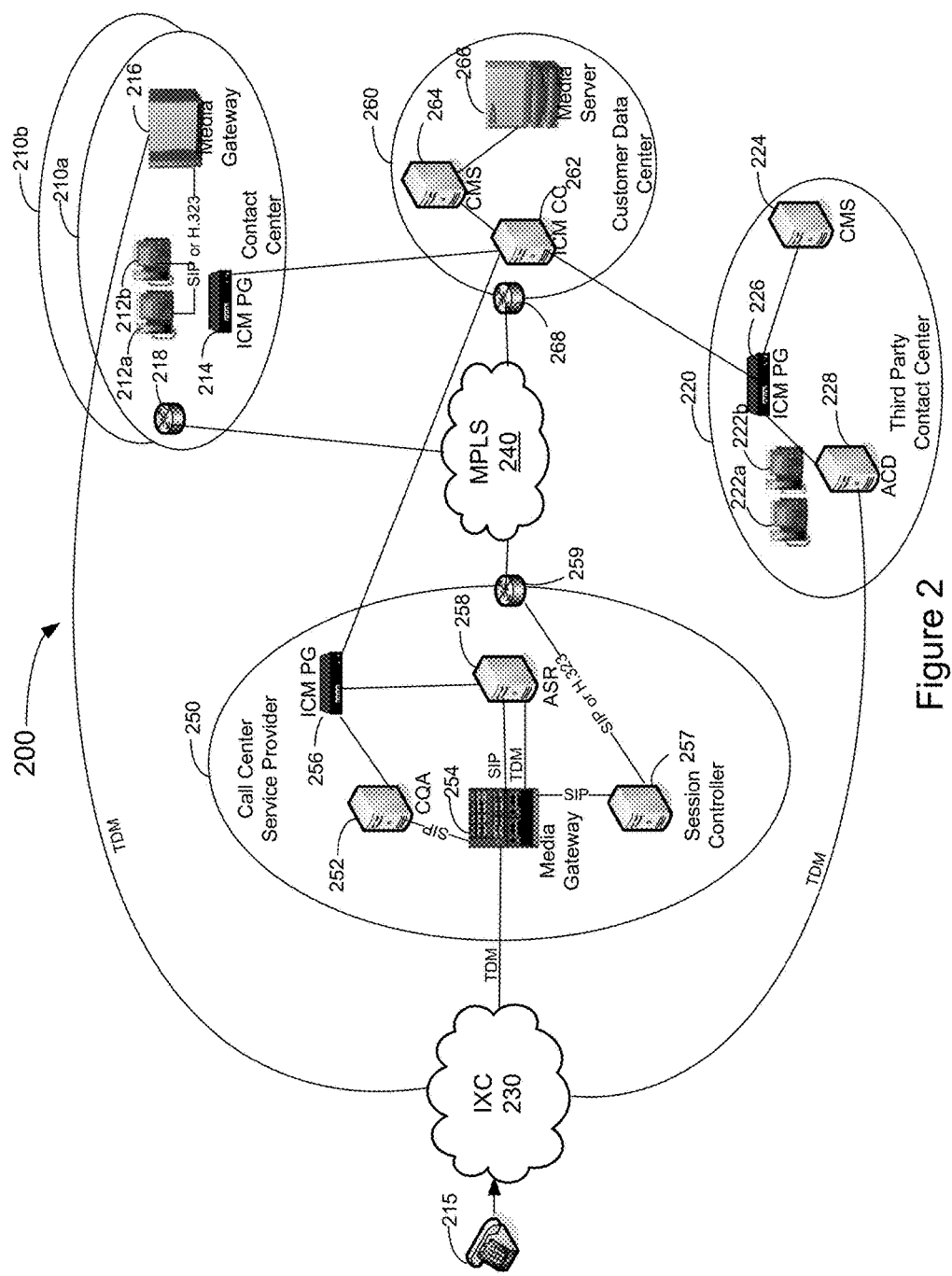
FIG. 2 is a diagrammatic representation of a system that includes a call center platform adapted for IP call delivery implemented in accordance with an embodiment of the invention.

FIG. 2 is a diagrammatic representation of a system 200 that includes a call center platform adapted for IP call delivery implemented in accordance with an embodiment of the invention. In the depicted system configuration, a contact center 210a may be communicatively coupled with an interactive call center service provider front end 250. Contact center 210a includes agent stations 212a-212b coupled with a media gateway 216. IP call signaling may be communicated between gateway 216 and agent stations 212a-212b via, for example, SIP and/or H.323. Contact center 210a additionally includes an intelligent call management (ICM) peripheral gateway (PG) 214. Contact center 210a may be communicatively coupled with front end 250 via router 218 for MPLS transmissions. Other contact centers 210b may be deployed in system 100 and configured in a similar manner as contact center 210a.

Front end 250 may include a media gateway 254 that may facilitate termination of customer call legs with an agent station. Front end 250 may include a server or other data processing system running a central queuing application (CQA) 252 that provides call queuing that is communicatively coupled with media gateway 254. CQA 252 may also be coupled with an ICM PG 256 that provides call management services. An ASR 258 provides voice recognition and response services and is coupled with media gateway 254 and ICM PG 256. A session controller 257 may be communicatively coupled with media gateway 254 and a router 259 that facilitates IP session allocation and management of customer call delivery between front end 250 and a contact center.

System 200 may include another contact center 220, e.g., a third party contact center 220, that includes agent stations 222a-220b. Contact center 220 may include a call management system (CMS) 224 connected with an ICM PG 226. An automatic call distributor (ACD) 228 may be coupled with ICM PG 226 and provides call dispatch services to agent stations 222a-222b.

System 200 includes a customer data center 260 that includes a customer center intelligent call management (ICM) server 262 that may interface with contact centers 210 and 220. A CMS 264 may be communicatively coupled with ICM server 262 and a media server 266. Customer center 260 may be communicatively coupled with front end 250 by a router 268, e.g., that is communicatively coupled with front end 250 over MPLS network 240.

A customer may be connected with front end 250 via a circuit switched telephone device 215 interconnected with an interexchange carrier (IXC) 230 that is connected with media gateway 254. The TDM call leg between media gateway 254 and device 215 may be bridged with an IP call session to an agent at a contact center, e.g., contact center 210 or 220. In the depicted system configuration, media server 266 provides a consolidated model for call distribution to multiple contact centers having media gateways, e.g., media gateway 216. While the illustrative example depicts coordination with a single ICM interface at a customer data center, e.g., at ICM server 262, multiple ICM points may be deployed if a customer provisions ICM services at separate contact centers. Calls to third party contact center 220 may require transfer/connect services and utilize TDM connections, but may be distributed on the customer's MPLS network 240 as available.

Figure 3:
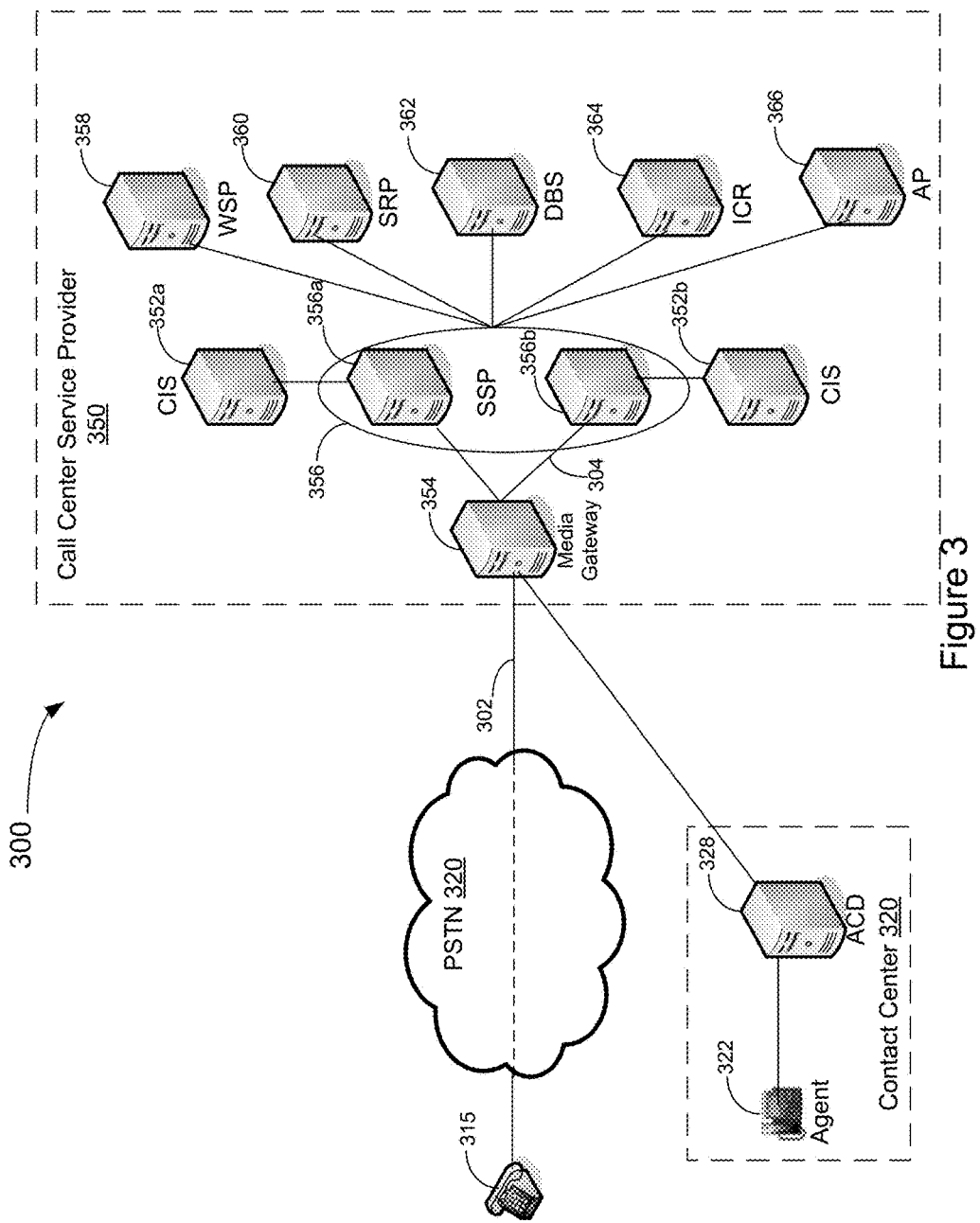
FIG. 3 is a diagrammatic representation of a network system configured for time division mulitplexed call delivery to a an interactive call center service provider front end and contact center implemented in accordance with an embodiment of the invention.

FIG. 3 is a diagrammatic representation of a network system 300 configured for time division mulitplexed (TDM) call delivery to a an interactive call center service provider front end and contact center implemented in accordance with an embodiment of the invention. In the illustrative example, a customer places a call to an interactive call center service provider front end 350 from a circuit-switched telephone 315. The call may be placed, for example, by dialing an 8YY number (e.g., an 800, 888, or other toll free number). The call is redirected through PSTN 320 to appropriate terminated T1s on a centralized media gateway 354 hosted by call center service provider front end 350. In the illustrative example, front tend 350 is configured with an SSP 356 that may include various resources that may be implemented at SSP servers 356a-356b (collectively referred to as SSP 356). SSP 356 is preferably automatic speech recognition (ASR) and text-to-speech (TTS) enabled. Moreover, SSP 356 supports both circuit-switched and packet-switched interfaces, and thus provides access for both TDM and VoIP calls. SSP servers 356a-356b may be communicatively coupled with respective client interface servers (CIS) 352a-352b and various other service provider entities, such as a web services platform (WSP) 358, speech recognition platform (SRP) 360, database services (DBS) 362, intelligent call routing server (ICR) 364, and analytics platform (AP) 366. On receipt of the call, media gateway 354 performs dialed number identification service (DNIS) validation and translations received from PSTN 320, and places an outbound call out the appropriate SSP resource, e.g., SSP server 356b.

SSP server 356b then runs the appropriate application associated with the DNIS presented in the call setup message. The application run by SSP server 356b allows for customer self service, e.g., access to account information, supply of service information, and the like, and may be terminated by the customer by supply of a suitable directive, e.g., a voice command. For example, the customer may terminate self service of the call by supplying a command that directs the SSP 356 to route the call to an agent at a contact center. The customer continues to flow through the application until the customer instructs SSP 356b to re-direct the caller to a target party (in this cased a 3rd party contact center). VRU implemented at SRP 360 then issues appropriate messaging to media gateway 354 causing it to pull the call back from SSP 356 and redirecting it to an appropriate target party destination based on pre-defined routing instructions, e.g., translation routing.

The contact center 320 receives the inbound call from media gateway 354 at ACD 328 and places the call in an appropriate queue until an agent becomes available. Once available, ACD 328 forwards the call to an available agent station 322, and the agent receives the call and answers it.

Figure 4:
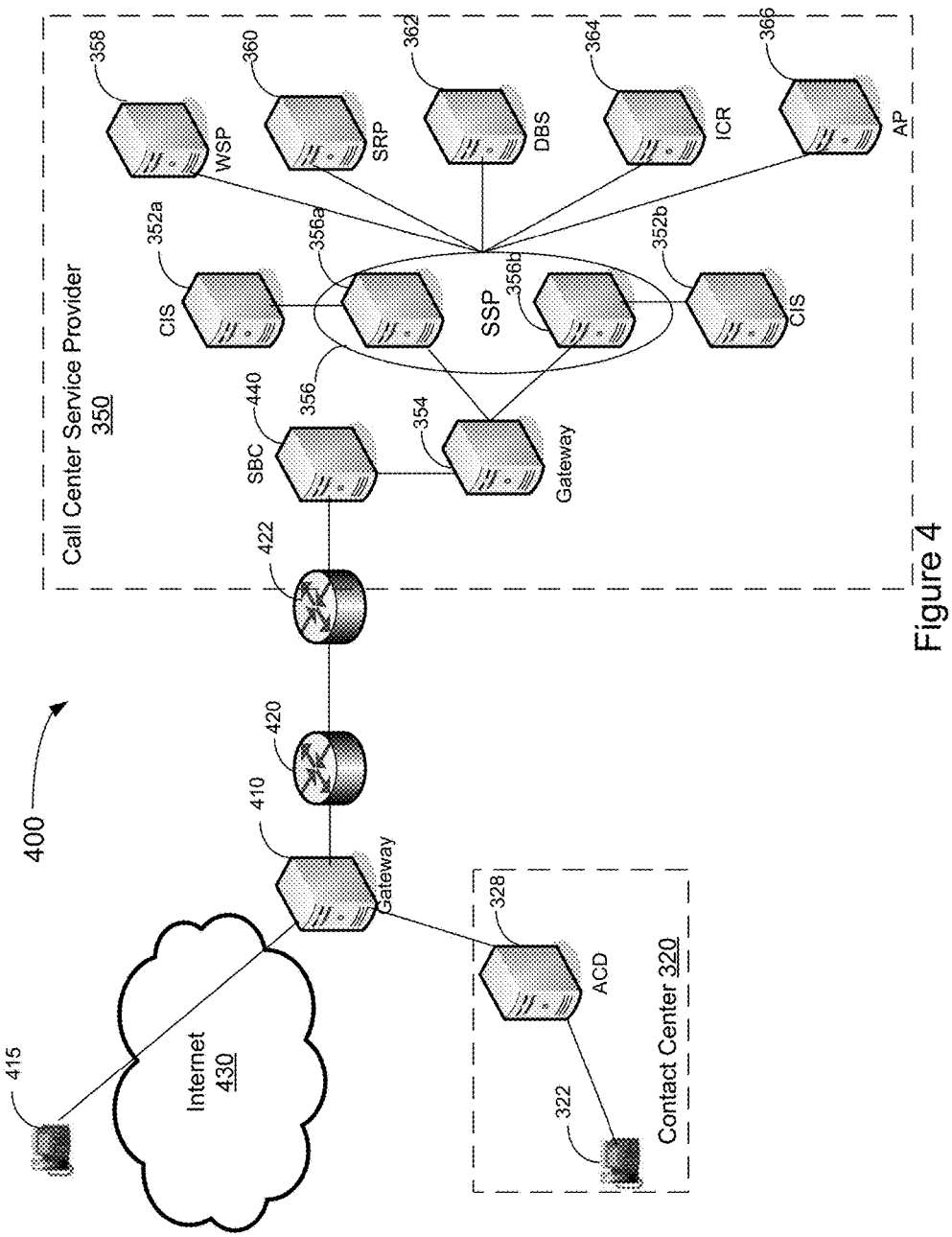
FIG. 4 is a diagrammatic representation of a network system configured for voice over IP call delivery to an interactive call center service provider front end and contact center implemented in accordance with an embodiment of the invention.

FIG. 4 is a diagrammatic representation of a network system 400 configured for voice over IP (VoIP) call delivery to an interactive call center service provider front end 350 and contact center 320 implemented in accordance with an embodiment of the invention. In the illustrative example, a customer places a call to an interactive call center service provider front end 350 from a IP telephony device 415. The call may be placed, for example, by dialing an 8YY number (e.g., an 800, 888, or other toll free number). The call is routed through Internet 430 to media gateway 410. Media gateway 410 performs translation/routing on the dialed number, selects an appropriate outbound port, and issues a SETUP/INVITE request to a Session Border Controller (SBC) 440 deployed in front end 350, e.g., via routers 420-422. SBC 440 re-directs the call based on policy routing and forwards the call to centralized media gateway 354. Media gateway 354 then receives the inbound SETUP/INVITE message and performs translation/routing on the inbound DNIS and redirects the call to SSP 356 for treatment. SSP 356 then runs the appropriate application associated with the DNIS presented in the call setup message. The customer continues to flow through the application until the customer instructs SSP 356 to re-direct the caller to a target party, e.g., a 3rd party contact center 320. VRU implemented as SRP 360 then issue appropriate messaging to media gateway 354 causing it to pull the call back from SSP 356 and redirect the call to an appropriate target party destination based on pre-defined routing instructions (e.g., translation routing). SBC 440 receive a re-direct message from centralized media gateway 354 and forwards to premise media gateway 410 for treatment as a SIP REFER request that includes an identity, e.g., a directory number, of third party contact center 320. Premise media gateway 410 receives the REFER request that signals the start of transfer of the call. Accordingly, premise media gateway 410 pulls the call back from central media gateway 354 and issues and outbound call to the 3rd party contact center ACD 328. Contact center ACD 328 receives the inbound call from media gateway 410 and places the call in appropriate queue until an agent station, e.g., agent station 322, becomes available. Once available, ACD 328 forwards the call thereto.

Figure 5:
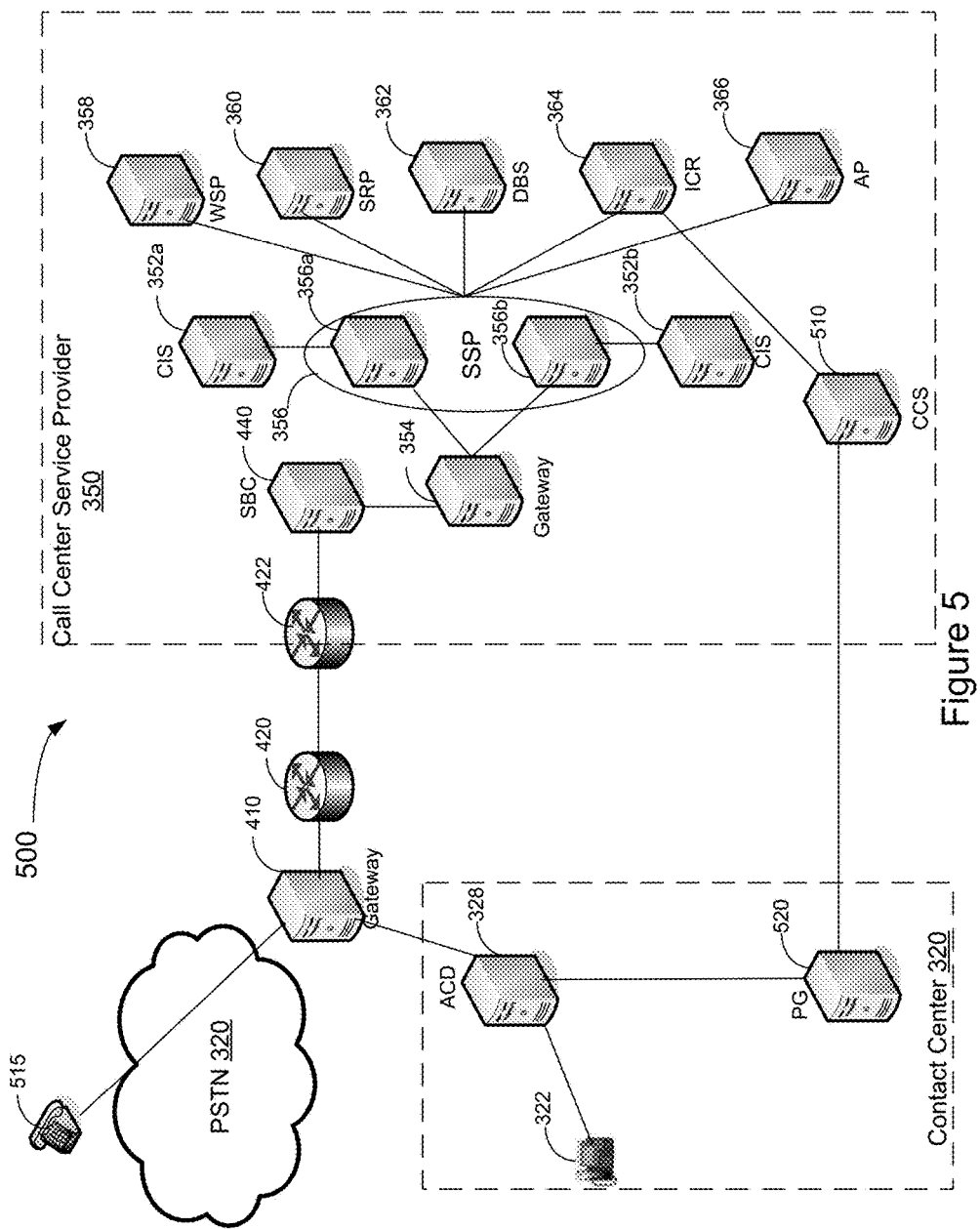
FIG. 5 is a diagrammatic representation of a network system configured for call delivery utilizing intelligent call routing and a central queue point for routing a call to a contact center implemented in accordance with an embodiment of the invention.

FIG. 5 is a diagrammatic representation of a network system 500 configured for call delivery utilizing intelligent call routing and a central queue point for routing a call to a contact center implemented in accordance with an embodiment of the invention. In the illustrative example, a customer places a call to an interactive call center service provider front end 350 from a circuit switched telephony device 515. The call may be placed, for example, by dialing an 8YY number (e.g., an 800, 888, or other toll free number). The call is redirected to appropriate terminated T1s or other communication links on media gateway 410. Media gateway 410 performs translation/routing on the dialed number and selects an outbound port of media gateway 410 from which a SETUP/INVITE request is issued to front end SBC 440 via routers 420-422. SBC 440 re-directs the call based on policy routing and forwards the call to centralized media gateway 354. Centralized media gateway 354 then receives the inbound SETUP/INVITE message and performs translation/routing on the inbound DNIS, and redirects the call to SSP 356 for treatment. SSP 356 then runs the appropriate application associated with the DNIS presented in the call setup message. The customer continues to flow through the application processing until the customer instructs SSP 356 to re-direct the call to a target party (in this cased a 3rd party contact center 320). SSP 356 then sends a ROUTE_REQUEST to an Intelligent Call Routing server (ICR) 364. ICR server 364 then forwards the ROUTE_REQUEST to a Central Controller Server (CCS) 510. CCS server 510 checks for agent availability, e.g., via contact center peripheral gateway 520. If no agents are available, CCS server 510 sends back a ROUTE_SELECTED message to instruct SSP 356 to re-direct the call to a Central Queue Point (CQP) run by SSP 356. ICR server 364 receives the ROUTE_SELECTED message and forwards the message to SSP 356 for proper handling. SSP 356, in turn, sends a REFER message to media gateway 354 for handling. Media gateway 354 receives the REFER message and re-directs the SIP/RTP stream to SSP 356 running as a CQP. The CQP-SSP platform receives the inbound call request and forwards a NEW_CALL message to ICR 364 which forwards the NEW_CALL request to CCS 510. CCS 510 then may either direct the CQP-SSP platform to play messages/scripts or await for agent availability. CCS 510 then sends a CONNECT message to ICR 364 when an agent is available. ICR 364 forwards the CONNECT message to the CQP-SSP 356 for handling. CQP-SSP 356 then issues a REFER message back to central media gateway 354. Central media gateway 354 then looks at the Target party number and determines if it handles the REFER message or forwards it to the originating media gateway 410 for processing. In the illustrative example, assume media gateway 354 forwards the REFER message to SBC 440. SBC 440 receives the REFER message and forwards the REFER message to the premise-based media gateway 410. Premise media gateway 410 then redirects the originating call to contact center 320. ACD 328 selects an agent and forwards call thereto, and the agent may answer the call.

Figure 6:
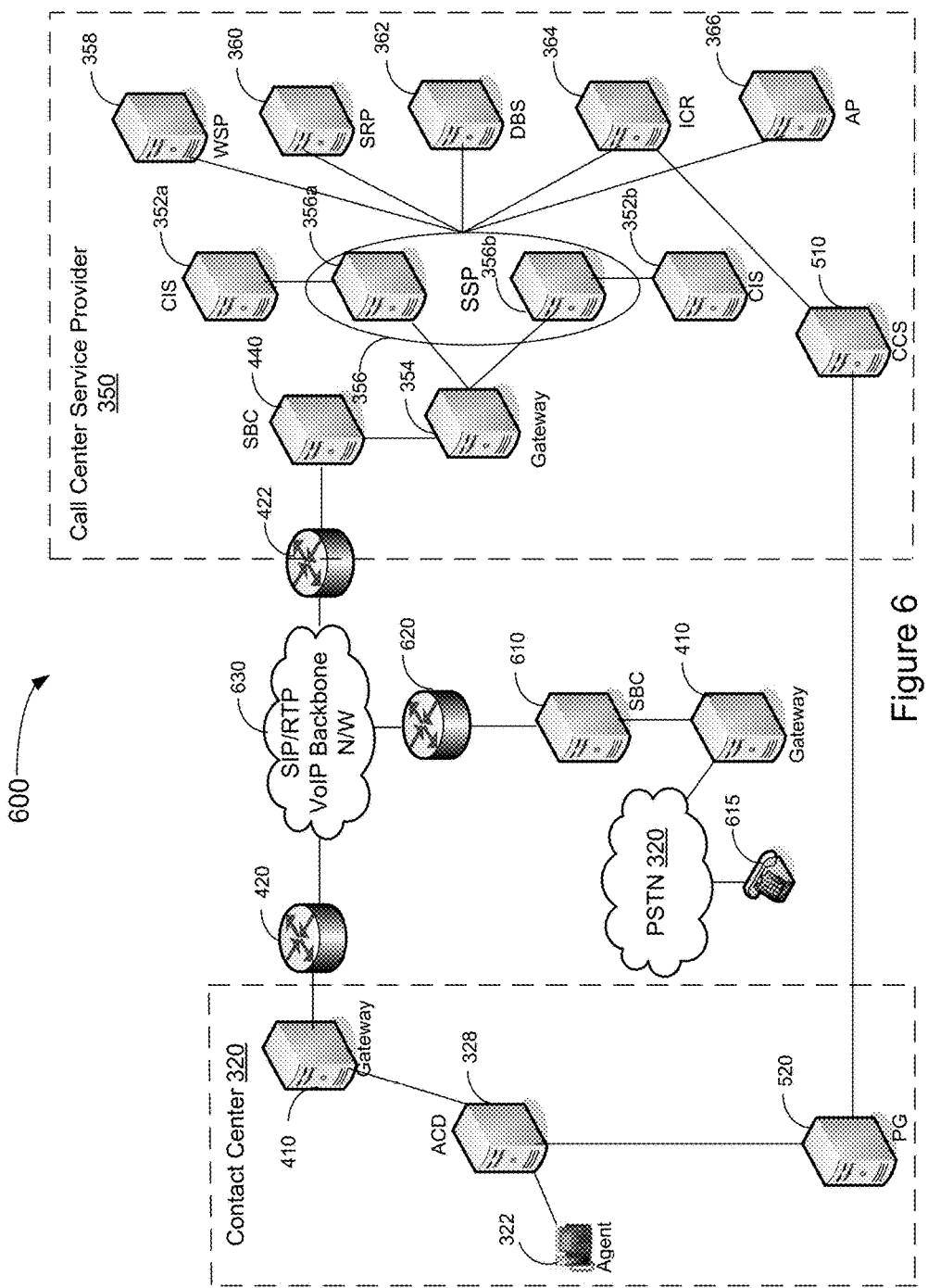
FIG. 6 is a diagrammatic representation of a network system configured for VoIP call delivery to a third party contact center implemented in accordance with an embodiment of the invention.

FIG. 6 is a diagrammatic representation of a network system 600 configured for VoIP call delivery to a third party contact center implemented in accordance with an embodiment of the invention. In the illustrative example, a customer places a call to a call center service provider 350 from a circuit switched telephony device 615. The call may be placed, for example, by dialing an 8YY number (e.g., an 800, 888, or other toll free number). The call is routed to gateway 410 via PSTN 320. Gateway 410 issues an INVITE/SETUP message that is transmitted to SBC 610 which forwards the INVITE/SETUP message to the call center service provider SBC 440, e.g., via a SIP/RTP backbone network 630. SBC 440 sends the INVITE/SETUP message to centralized media gateway 354 which validates the DNIS information and forwards the INVITE message to SSP 356 for processing. SSP 356 may then interact with the caller. For illustrative purposes, assume the caller elects to be routed to an agent, e.g., by a menu selection or voice input. SSP 356 sends a ROUTE_REQUEST message to ICR 364. ICR 364 forwards the ROUTE_REQUEST message to CCS 510. CCS 510 selects where to send the call and returns a ROUTE_SELECT message with target party (TP) information. ICR 364 receives the ROUTE_SELECT message and forwards the ROUTE_SELECT message to SSP 356. SSP 356 obtains the TP Number from the ROUTE_SELECT message and issues a REFER message to media gateway 354. Media gateway 354 receives the REFER message and determines if it needs to forward or act on the REFER message. In the illustrative example, assume media gateway 354 forwards the REFER message to call center service provider SBC 440. SBC 440 forwards the REFER message to the IP carrier SBC 610 which conveys the REFER message to carrier media gateway 410 for treatment. Carrier media gateway 410 validates the TP number and selects an appropriate route to the TP number. Carrier media gateway 410 then sends the REFER message to SBC 610 which forwards the REFER message to premise media gateway 410. Premise media gateway 410 validates the DNIS and places the call out to contact center ACD 328. Contact center ACD 328 receives the SETUP/INVITE message and locates an available agent station 322. The call is routed to the available agent station, and the agent may answer the call.

As described, mechanisms for processing calls in a call center system are provided. A call center platform provides for customized delivery of calls to contact centers. The call center platform provides the ability to transfer calls in a manner that reduces carrier connection costs and intra-state costs. The call center platform provides alternative connectivity mechanisms, e.g., packet-switched, circuit-switched, and multiprotocol label switching connectivity, for a call center enterprise customer. An interactive call center service provider front end includes a media gateway adapted to receive circuit-switched and packet-switched customer calls and a self service platform and a self service platform. Customer calls may be directly connected with the call center front end and contact center via circuit switched connections, via VoIP connections, and may be connected utilizing intelligent call routing and central queue point mechanisms.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for processing calls in a call center system, comprising:
   receiving a call from a customer at an interactive call center front end, wherein the interactive call center front end is interfaced with a circuit switched network and a packet network and is configured to receive circuit-switched, packet-switched, and multiprotocol label switching calls, and further configured to support class 4 switching to provide direct connection to contact center automatic call distributors;
   conveying the call to a self service platform for processing of the call;
   receiving a directive from the customer to connect the call with an agent;
   determining a contact center of a plurality of contact centers to route the call; and
   routing the call to an automatic call distributor of the call center.

2. The method of claim 1, wherein receiving the call comprises receiving the call at a media gateway deployed in the interactive call center front end.

3. The method of claim 1, further comprising processing the call by the self service platform according to dialed number information service data associated with the call.

4. The method of claim 1, wherein receiving the directive further comprises receiving a voice input from the customer that indicates the self service processing of the call is to be terminated.

5. The method of claim 1, wherein the directive is received from a voice response unit, the method further comprising directing, by the voice response unit, the self service platform to remove the call from processing by the voice response unit in response to receiving the directive.

6. The method of claim 5, further comprising pulling the call back from the self service platform, wherein the call is then processed by a media gateway.

7. The method of claim 6, further comprising:
   issuing, by the media gateway, a redirect message comprising a directory number associated with the contact center;
   receiving, by a second media gateway external to the interactive call center front end, the re-direct message;
   pulling the call back from the media gateway by the second media gateway; and
   issuing, by the second media gateway, an outbound call to the directory number that is bridged with the call.

8. The method of claim 7, wherein the re-direct message comprises a session initiation protocol REFER message.

9. A non-transitory computer-readable medium having computer-executable instructions for execution by a processing system, the computer-executable instructions for processing calls in a call center, the computer-readable medium comprising instructions for:
   receiving a call from a customer at an interactive call center front end, wherein the interactive call center front end is interfaced with a circuit switched network and a packet network and is configured to receive circuit-switched, packet-switched, and multiprotocol label switching calls, and further configured to support class 4 switching to provide direct connection to contact center automatic call distributors;

conveying the call to a self service platform for processing of the call;

receiving, by a voice response unit, a directive from the customer to connect the call with an agent;

directing, by the voice response unit, the self service platform to terminate processing of the call by the voice response unit and return processing to the self service platform;

determining a call contact of a plurality of contact centers to route the call; and routing the call to an automatic call distributor of the contact center.

10. The non-transitory computer-readable medium of claim 9, wherein the instructions for receiving the call comprise instructions for receiving the call at a media gateway deployed in the interactive call center front end.

11. The non-transitory computer-readable medium of claim 9, further comprising instructions for processing the call by the self service platform according to dialed number information service data associated with the call.

12. The non-transitory computer-readable medium of claim 9, wherein the instructions for receiving the directive further comprise instructions for receiving a voice input from the customer that indicates self service processing of the call is to be terminated.

13. The non-transitory computer-readable medium of claim 9, further comprising instructions for pulling the call back from the self service platform, wherein the call is then processed by the media gateway.

14. The computer-readable medium of claim 13, further comprising instructions for:
issuing, by the media gateway, a redirect message comprising a directory number associated with a contact center;
receiving, by a second media gateway external to the interactive call center front end, the re-direct message;
pulling the call back from the media gateway by the second media gateway; and
issuing, by the second media gateway, an outbound call to the directory number that is bridged with the call.

15. The computer-readable medium of claim 14, wherein the re-direct message comprises a session initiation protocol REFER message.

16. A system for processing calls in a call center, comprising:
an interactive call center front end comprising a media gateway configured to interface with a circuit-switched network, a packet-switched network, multiprotocol label switching network, a self service platform, a voice response unit, and an intelligent call routing server, wherein the interactive call center front end is configured to support class 4 switching to provide direct connection to contact center automatic call distributors; and a plurality of contact centers communicatively coupled with the front end, wherein
the intelligent call routing server is communicatively coupled with at least one of the contact centers,
the front end is configured to receive a call from a customer and convey the call to the self service platform for processing,
the self service platform is configured to invoke an application for processing the call based at least in part on dialed number identification service data associated with the call,
the call is conveyed to the voice response unit for processing until the voice response unit receives a directive from the customer to connect the call with an agent,
the voice response unit is configured to direct the self service platform to terminate processing of the call by the voice response unit and return processing to the self service platform,
the intelligent call routing server is configured to determine a contact center of the plurality of contact centers to route the call, and
the call is routed to an automatic call distributor of the contact center.

17. The system of claim 16, wherein the call is received at the media gateway deployed in the interactive call center front end.

18. The system of claim 16, wherein the directive comprises a voice input from the customer that indicates the self service processing of the call is to be terminated.

19. The computer-readable medium of claim 16, wherein the media gateway issues a redirect message comprising a directory number associated with the contact center.

20. The system of claim 19, further comprising a second media gateway external to the interactive call center front end that receives the re-direct message, pulls the call back from the media gateway, and issues an outbound call to the directory number for terminating the call with the contact center.

* * * * *